(12) United States Patent
Browne et al.

(10) Patent No.: US 12,326,810 B2
(45) Date of Patent: Jun. 10, 2025

(54) PROCESSOR UNIT RESOURCE EXHAUSTION DETECTION AND REMEDIATION

(71) Applicant: Intel Corporation, Santa Clara, CA (US)

(72) Inventors: John J. Browne, Limerick (IE); Adrian Boczkowski, Kuyavian-Pomeranian (PL); Marcel D. Cornu, Kilnaboy (IE); David Hunt, Meelick (IE); Shobhi Jain, Shannon (IE); Tomasz Kantecki, Ennis (IE); Liang Ma, Shannon (IE); Chris M. MacNamara, Ballyclough (IE); Amruta Misra, Bangalore (IN); Terence Nally, Limerick (IE)

(73) Assignee: Intel Corporation, Santa Clara, CA (US)

( * ) Notice: Subject to any disclaimer, the term of this patent is extended or adjusted under 35 U.S.C. 154(b) by 937 days.

(21) Appl. No.: 17/185,648

(22) Filed: Feb. 25, 2021

(65) Prior Publication Data
US 2021/0182194 A1    Jun. 17, 2021

Related U.S. Application Data

(60) Provisional application No. 63/130,688, filed on Dec. 26, 2020.

(51) Int. Cl.
*G06F 12/00* (2006.01)
*G06F 9/50* (2006.01)
(Continued)

(52) U.S. Cl.
CPC ........ *G06F 12/0811* (2013.01); *G06F 9/5016* (2013.01); *G06F 9/5022* (2013.01);
(Continued)

(58) Field of Classification Search
CPC ............ G06F 12/0811; G06F 12/0871; G06F 9/5016; G06F 9/5022; G06F 11/0793; G06F 2212/1021
See application file for complete search history.

(56) References Cited

U.S. PATENT DOCUMENTS

| | | | | |
|---|---|---|---|---|
| 6,898,718 B2 * | 5/2005 | Morrow | ................ | G06F 1/3203 713/323 |
| 8,578,355 B1 * | 11/2013 | Mars | ....................... | G06F 8/443 717/153 |

(Continued)

OTHER PUBLICATIONS

A. Gupta, J. Sampson and M. Bedford Taylor, "TimeCube: A manycore embedded processor with interference-agnostic progress tracking," 2013 International Conference on Embedded Computer Systems: Architectures, Modeling, and Simulation (SAMOS), Agios Konstantinos, Greece, 2013, pp. 227-236. (Year: 2013).*

*Primary Examiner* — Daniel D Tsui
(74) *Attorney, Agent, or Firm* — Alliance IP, LLC

(57) ABSTRACT

A performance monitor provides cache miss stall and memory bandwidth usage metric samples to a resource exhaustion detector. The detector can detect the presence of last-level cache and memory bandwidth exhaustion conditions based on the metric samples. If cache miss stalls and memory bandwidth usage are both trending up, the detector reports a memory bandwidth exhaustion condition to a resource controller. If cache miss stalls are trending up and memory bandwidth usage is trending down, the detector reports a last-level cache exhaustion condition to the resource controller. The resource controller can allocate additional last-level cache or memory bandwidth to the processor unit to remediate the resource exhaustion condition. If bandwidth-related metric samples indicate that a (Continued)

processor unit may be overloaded due to receiving high bandwidth traffic, the resource controller can take a traffic rebalancing remedial action.

25 Claims, 7 Drawing Sheets

(51) Int. Cl.
G06F 11/07 (2006.01)
G06F 12/0811 (2016.01)
G06F 12/0871 (2016.01)

(52) U.S. Cl.
CPC ...... G06F 11/0793 (2013.01); G06F 12/0871 (2013.01); G06F 2212/1021 (2013.01)

(56) References Cited

U.S. PATENT DOCUMENTS

| | | | |
|---|---|---|---|
| 11,836,525 B2* | 12/2023 | Wasserman | G06F 12/0811 |
| 2009/0287903 A1* | 11/2009 | Hsu | G06F 12/0862 |
| | | | 711/119 |
| 2009/0327609 A1* | 12/2009 | Fleming | G06F 12/0802 |
| | | | 713/300 |
| 2012/0079235 A1* | 3/2012 | Iyer | G06F 9/4881 |
| | | | 712/30 |
| 2012/0278595 A1* | 11/2012 | Indukuru | G06F 9/3867 |
| | | | 712/219 |
| 2014/0297920 A1* | 10/2014 | Takeda | G06F 15/167 |
| | | | 711/147 |
| 2014/0337849 A1* | 11/2014 | Seo | G06F 9/4881 |
| | | | 718/102 |
| 2014/0359335 A1* | 12/2014 | Seo | G06F 1/3287 |
| | | | 713/320 |
| 2015/0248295 A1* | 9/2015 | Michalak | G06F 11/3024 |
| | | | 712/216 |
| 2016/0011874 A1* | 1/2016 | Orenstein | G06F 9/30145 |
| | | | 712/237 |
| 2017/0147248 A1* | 5/2017 | Chitti | G06F 3/061 |
| 2018/0088944 A1* | 3/2018 | Subramanian | G06F 9/30047 |
| 2020/0026605 A1* | 1/2020 | Barsness | G06F 11/2023 |
| 2020/0336425 A1* | 10/2020 | Galles | H04L 49/109 |
| 2021/0157700 A1* | 5/2021 | Dorsey | G06F 11/3409 |
| 2021/0182194 A1* | 6/2021 | Browne | G06F 11/0793 |
| 2022/0045940 A1* | 2/2022 | Subrahmanya | G06F 16/907 |
| 2022/0100567 A1* | 3/2022 | Krishnan | G06T 1/60 |

* cited by examiner

PROCESSOR UNIT RESOURCE EXHAUSTION DETECTION AND REMEDIATION

CROSS-REFERENCES TO RELATED APPLICATIONS

This Application claims the benefit of priority to U.S. Provisional Patent Application Ser. No. 63/130,688 filed on Dec. 26, 2020, and titled, "Processing Unit Shared Resource Exhaustion and Remediation". The disclosure of the prior application is considered part of and is hereby incorporated by reference in its entirety in the disclosure of this application.

BACKGROUND

In multi-core processors, processor cores can share resources internal and external to the processor. Internal shared resources typically include a last-level cache and external shared resources include bandwidth of the memory interface between the processor core and main memory. If not enough of a shared resource is available to a processor core, performance can become degraded.

DETAILED DESCRIPTION

Figure 1:
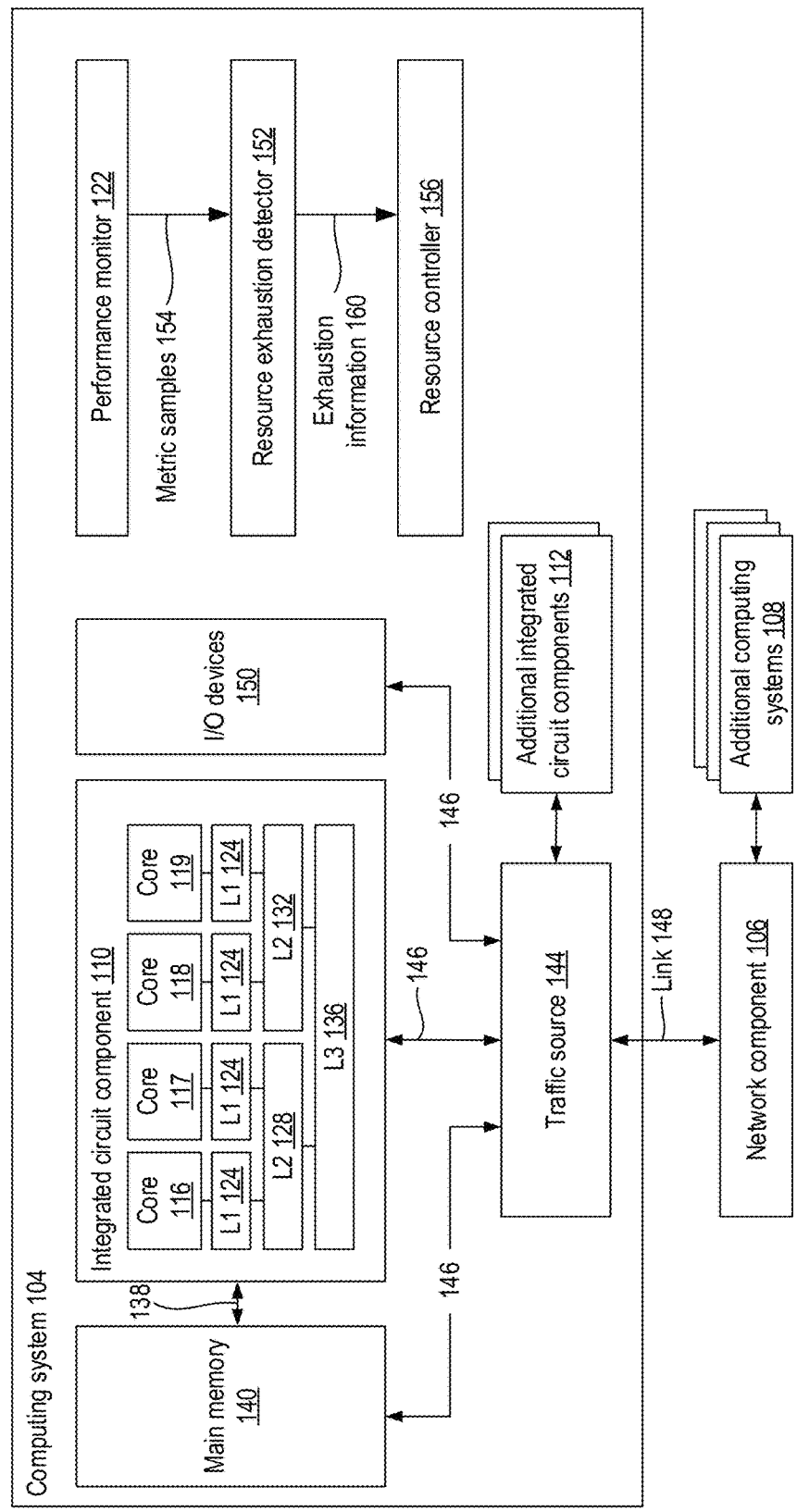
FIG. 1 illustrates an example computing environment for processor unit resource exhaustion detection and remediation.

Current generation processor units share resources, such as last-level cache (LLC) and memory bandwidth across cores on a socket or within a package. It is possible for one or more cores in a processor unit to overutilize these resources, rendering other cores under-resourced and affecting their performance or for a single core to become performance-limited by fully utilizing an allocated amount of a shared resource. Disclosed herein are technologies that detect the exhaustion of processor unit resources and take remedial actions to recover from the resource exhaustion condition.

The resource exhaustion detection and remediation technologies disclosed herein comprise a resource exhaustion detector and a resource controller. The resource detector monitors platform and/or component metrics provided to the detector by a performance monitor and notifies the resource controller when it has detected a resource exhaustion condition based on the received metrics. Upon being notified of a resource exhaustion condition, the resource controller dynamically manages computing system resources to remediate the resource exhaustion condition. The resource controller can allocate additional last-level cache or memory bandwidth to a processor unit whose performance is being limited by resource availability. The resource controller can also act as a traffic rebalancer and redistribute traffic to remediate a resource exhaustion condition caused by a processor unit receiving a high amount of incoming traffic.

The resource exhaustion detector informs the resource controller when the amount of LLC or memory bandwidth allocated to a processor unit has been exhausted. LLC exhaustion can occur when application data is frequently evicted from the LLC, which causes repeated loads of the same data. Memory bandwidth exhaustion can occur when the memory subsystem comes under heavy usage which causes higher latencies for memory operations. These scenarios can result in poor processor unit utilization and can significantly impact application performance. Exposing metrics related to processor unit utilization and memory bandwidth usage allow hardware and software to detect and react to situations where shared resource contention negatively impacts application performance.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the instructions contained in the software or firmware are not actively being executed by the system, device, platform, or resource.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates an example computing environment for processor unit resource exhaustion detection and remediation. The computing environment 100 comprises a computing system 104, a traffic source 144, main memory 140, a performance monitor 122, a resource exhaustion detector 152, and a resource controller 156. The computing system 104 comprises an integrated circuit component 110 comprising four cores 116-119. Each core has its own level one (L1) cache 124. Cores 116 and 117 share a level 2 (L2) cache 128 and cores 118 and 119 share an L2 cache 132. The cores 116-119 share a level 3 (L3) cache 136. The L3 cache 136 is the last-level cache for the integrated circuit component 110. The integrated circuit component 110 interfaces with the main memory 140 over a memory interface 138. The main memory 140 comprises one or more memories or devices (e.g., dynamic random-access memories (DRAMs), phase-change memories (PCM), flash memories, solid-state drives (SSDs), and hard disk drives (HDDs)) belonging to one or more layers in a memory and storage hierarchy of the computing system 104.

As used herein, the term "integrated circuit component" refers to a packaged or unpacked integrated circuit product. A packaged integrated circuit component comprises one or more integrated circuits mounted on a package substrate. In one example, a packaged integrated circuit component comprises one or more processor units mounted on a substrate, with an exterior surface of the substrate comprising a solder ball grid array (BGA). In one example of an unpackaged integrated circuit component, a single monolithic integrated circuit die comprises solder bumps attached to contacts on the die. The solder bumps allow the die to be directly attached to a printed circuit board. An integrated circuit component can comprise one or more of any computing system component described or referenced herein, such as a processor unit (e.g., system-on-a-chip (SoC), processor cores, graphics processor unit (GPU), accelerator), I/O controller, chipset processor, memory, or network interface controller.

As used herein, the term "memory bandwidth" refers to the bandwidth of a memory interface (e.g., interface 138 in FIG. 1) between a last-level cache located in an integrated circuit component and a memory located external to the integrated circuit component.

The traffic source 144 provides traffic to the integrated circuit component 110, main memory 140, I/O devices 150, and one or more additional integrated circuit components 112. In some embodiments, the interconnections 146 can be Peripheral Component Interface Express (PCIe) links. In some embodiments, the traffic source 144 can be a network interface controller (NIC) that receives inbound traffic to the computing system 104 from one or more additional computing systems 108 over a link 148. A network component 106, such as a switch or a router, can be located between the additional computing systems 108 and the computing system 104.

The performance monitor 122 generates platform- and component-level metric samples 154 for the computing system 104. For example, the performance monitor 122 can generate component-level metric samples for the cores 116-119; caches 124, 128, 132, 136; main memory 140; and traffic source 144. Although the performance monitor 122 is illustrated in FIG. 1 as a separate component in the computing system 104, in some embodiments, the performance monitor 122 can be distributed across one or more of the components of the computing system 104. For example, the performance monitor 122 can comprise performance monitors integrated into the traffic source 144 and the integrated circuit component 110, such as performance monitors integrated into each of the cores 116-119 and a memory controller performance monitor integrated into a processor unit. Performance monitors integrated into a computing component can generate metric samples for constituent components of the component, such as devices, ports, and sub-ports within a component. Performance monitors can generate metric samples for traffic rate, bandwidth and other metrics related to interfaces or interconnect technology providing traffic to a component (e.g., PCIe, Intel® compute express link (CXL), cache coherent interconnect for accelerators (CCIX®), serializer/deserializer (SERDES), Nvidia® NVLink, ARM Infinity Link, Gen-Z, Open Coherent Accelerator Processor Interface (OpenCAPI)).

The performance monitor 122 can be implemented as hardware, software, firmware, or a combination thereof. Reference to a performance monitor integrated into a computing system component, such as a processor unit performance monitor does not preclude the performance monitor 122 from comprising performance monitors integrated into other computing system components or a platform-level performance monitor.

Metrics for which the performance monitor 122 can generate metric samples (an individual value for a metric generated or measured at a particular point in time) include per-processor unit (e.g., per-core) metrics such instruction cycle count metrics, cache hit metrics, cache miss metrics, cache miss stall metrics, and branch miss metrics. These metric samples can be provided in various forms such as a number of events occurring within a reporting period, a percentage (e.g., percentage of cache accesses that result in a cache hit or miss), or a rate (e.g., memory bandwidth usage). In some embodiments, a cache miss stall metric sample is the number of processor unit stall cycles performed by a processor unit while last-level cache (LLC) miss demands load are outstanding within a reporting period. In some embodiments, the performance monitor can comprise an Intel® Performance Monitoring Unit (PMU) located in an integrated circuit component. For some Intel® Xeon processors, the Intel® PMU provides the CYCLE_ACTIVITY.STALLS_L3_MISS metric, which is a count of execution stall cycles while L3 cache miss demand loads are outstanding.

The performance monitor 122 can further generate memory bandwidth usage metrics samples, such as the amount of memory bandwidth used on a per-processor unit (e.g., per-core) basis. In some embodiments, the performance monitor 122 can comprise Intel® Resource Director Technology (RDT). Intel® RDT is a set of technologies that enables tracking and control of shared resources, such as LLC and memory bandwidth used by applications, virtual machines, and containers. Intel® RDT elements include CMT (Cache Monitoring Technology), CAT (Cache Allocation Technology), MBM (Memory Bandwidth Monitoring), and MBA (Memory Bandwidth Allocation). The Intel® MBM feature of RDT can generate metrics that indicate the amount of memory bandwidth used by individual processor cores.

The performance monitor 122 can also provide samples for traffic bandwidth metrics related to the bandwidth of traffic sent by the traffic source 144 over the interconnections 146. For example, the performance monitor 122 can provide samples for traffic bandwidth metrics that indicate the amount of traffic sent by the traffic source 144 over the individual interconnections 146 to the various components shown in FIG. 1 or the amount of traffic bandwidth received from the traffic source 144 by each of these various components. In some embodiments where the interconnections 146 are PCIe links and the integrated circuit component 110 is an Intel® processor, the performance monitor 122 can provide metric samples for individual integrated I/O stacks in the processor, such as the bandwidth of traffic received by an individual IIO.

The resource exhaustion detector 152 detects whether a shared resource (e.g., memory bandwidth, LLC) is exhausted based on metric samples 154 provided by the performance monitor 122. A resource can be exhausted by, for example, being oversubscribed to, being fully utilized or having its utilization exceed a utilization threshold, or by having the amount of the resource allocated to a particular processor unit being fully utilized or having the amount of the resource allocated to the particular processor unit exceed a utilization threshold. For example, the detector 152 can detect whether one of the cores 116-119 is overloaded due to exhaustion of the L3 cache 136 or the bandwidth of the memory interface 138 allocated to the core and send resource exhaustion information to a resource controller 156 to inform the controller of a resource exhaustion condition. The resource exhaustion detector 152 can receive the metric samples 154 by pulling metrics samples 154 from the performance monitor 122 or by the performance monitor 122 pushing the metric samples 154 to the detector 152 on a periodic or other basis. For example, the performance monitor 122 can provide a cache miss stall metric sample and a memory bandwidth metric sample every second.

The resource exhaustion detector 152 determines whether a shared resource is exhausted for a processor unit based on the metric samples 154 received from the performance monitor 122. Approaches used by the resource exhaustion detector 152 to determine LLC or memory bandwidth exhaustion for a processor unit, and whether to perform traffic rebalancing, is discussed in greater detail below in regard to FIG. 2. Upon detecting a resource exhaustion condition, the resource exhaustion detector 152 sends exhaustion information 160 to the resource controller 156. The exhaustion information 160 comprises information indicating which processor unit is experiencing a resource exhaustion condition and which shared resource (e.g., last-level cache, memory bandwidth) has been determined to be exhausted. The exhaustion information 160 can also comprise information indicating that traffic rebalancing is to be performed.

In response to receiving exhaustion information 160, the resource controller 156 can cause a remedial action to be taken to remediate the exhaustion condition. In response to being informed of a last-level cache exhaustion condition, the resource controller 156 can cause the last-level cache to be reallocated. Reallocation of the last-level cache can comprise allocating additional last-level cache for use by the processor unit experiencing the resource exhaustion condition (the limited processor unit). In some embodiments, reallocation of the last-level cache can comprise modifying the number of sets in the cache, cache line size, and/or the type of cache mapping used (direct-mapped or set-associative). If all of the last-level cache memory has been allocated, the resource controller 156 can cause the LLC to be repartitioned so that some LLC that had been allocated for use by one or more other processor units is reallocated for use by the limited processor unit. In response to being informed of a memory bandwidth exhaustion condition, the resource controller 156 can cause additional memory bandwidth to be allocated for use by the limited processor unit. If no memory bandwidth is available for allocation, the resource controller 156 can reallocate memory bandwidth allocated to one or more other processor units to the limited processor unit.

In some embodiments, additional last-level cache or additional memory bandwidth is allocated to the limited processor unit if the limited processor unit is one that has been designated as having a high priority (high priority processor unit). The priority of a processor unit can be set by the operating system or a hypervisor operating on a computing system. The priority of a processor unit can be based on, for example, processor unit capabilities and/or the type of workload or application being executed or to be executed on the processor unit. For example, a processor unit with a higher peak operating frequency, larger L1 and L2 dedicated caches, etc., that other processor units can be designated a high priority processor unit, and a processor unit that is to execute a workload that is, for example, deemed a high priority workload according to a customer's service level agreement (SLA) or a memory-intensive application, can be set to high priority prior to executing the application or high priority workload.

In some embodiments, the remedial action comprises reallocating LLC from a processor unit assigned a low priority (low priority processor unit) to a limited processor unit. Reallocating last-level cache can comprise changing the priority of a processor unit from high priority to low priority and reallocating LLC from the processor unit having the newly assigned low priority to the limited processor unit. In some embodiments, the resource controller 156 can reallocate memory bandwidth from a low priority processor unit to the limited processor unit. Reallocating memory bandwidth can comprise changing the priority of a processor from a high priority to a low priority and reallocating LLC from the processor unit having the newly assigned low priority to the limited priority unit. Intel® Speed Select Technology (SST) is one implementation of designating priorities for processor units.

In some embodiments, the remedial action can comprise setting a priority for the application executing on the limited processor unit when the exhaustion condition occurs to a high priority. A high priority setting for an application can indicate that the application is to be executed on a high priority processor unit to reduce the likelihood that the application will experience a resource exhaustion condition when executed. In some embodiments, a high priority application setting can be set for a class of applications to which the application executing on the limited processor unit when the exhaustion condition occurs belongs. Any application belonging to the high priority application class can be executed on a high priority processor.

In some embodiments, the amount of memory bandwidth and/or LLC allocated to a processor unit after shared resources have been reallocated by the resource controller

156 to remedy a resource exhaustion condition can be associated with the application. The next time the application is executed, LLC and/or memory bandwidth can be allocated for the processor unit that will be executing the application based on the memory bandwidth and/or LLC allocation information associated with the application.

In other embodiments, processor unit and application priority schemes can have more than two priority tiers (e.g., more than just "high" and "low" tiers). In such embodiments, the resource controller 156 can reallocate LLC and memory bandwidth to a limited processor unit from a processor unit having lower priority than that of the limited processor unit. In some embodiments, the lower the priority of a processor unit, the more LLC or memory bandwidth the resource controller 156 reallocates away from the lower priority processor unit to the limited processor unit.

Additional remedial actions that can be taken by resource controller 156 include increasing an operating voltage or frequency of the limited processor unit. Increasing the operating frequency of the limited processor unit can comprise enabling a temporary high-performance mode for the processor unit, such as a "turbo" mode found on some Intel® processors. In some Intel® processors, Intel® Speed Select Technology (SST) can be used to increase the base frequency of the limited processor unit (using SST-base frequency (SST-BF) technology) and to control the allocation of power among processor units in a computing system (using SST-core priority (SST-CP) technology).

In some embodiments, the remedial action can comprise moving an application executing on the limited processor unit from a first socket to a second socket or scaling up the number of processor units executing the application executing on the computing system.

The remedial actions described above as being taken in regard to an application operating on a processor unit can be taken for a hypervisor, orchestrator, container, microservice, or other software entity executing on a processor unit. For example, if the limited processor unit is executing an application within a container environment, the remedial action can comprise scaling up the number of container instances executing the application on the computing system or moving the container to another computing system.

Although the resource exhaustion detector 152 and the resource controller 156 are shown as being included in the computing system 104, in other embodiments, one or both of these components can be external to the computing system 104. For example, the computing system 104 can be located in a data center and the computing system 104 can send metric samples generated by the performance monitor 122 to a resource exhaustion detector and a resource controller that are part of an orchestration environment that manages data center resources. A remote resource controller can cause remedial actions to be taken by a computing system to remediate a resource exhaustion condition at the computing system. In some embodiments, the resource exhaustion detector and the resource controller can be combined into a single component.

In some embodiments, the resource controller can comprise a software-defined network (SDN) controller or network function virtualization (NFV) infrastructure (NFVI) element (e.g., NFV orchestrator (NFVO), virtualized infrastructure manager (VIM), virtual network function manager (VNFM)) that takes a remedial action (e.g., traffic rebalancing remedial action) to be taken to remediate a resource exhaustion condition. In some embodiments, the resource controller 156 can comprise multiple components, such as a traffic rebalancer that causes traffic remediation actions to be taken and one or more other components that cause other remediation actions to be taken.

As the resource exhaustion detector 152 and resource controller 156 detect a resource exhaustion condition and take a remedial action based on traffic bandwidth metrics, the technologies described herein can detect overload conditions and take remedial action without knowledge of traffic type or packet size.

Figure 2:
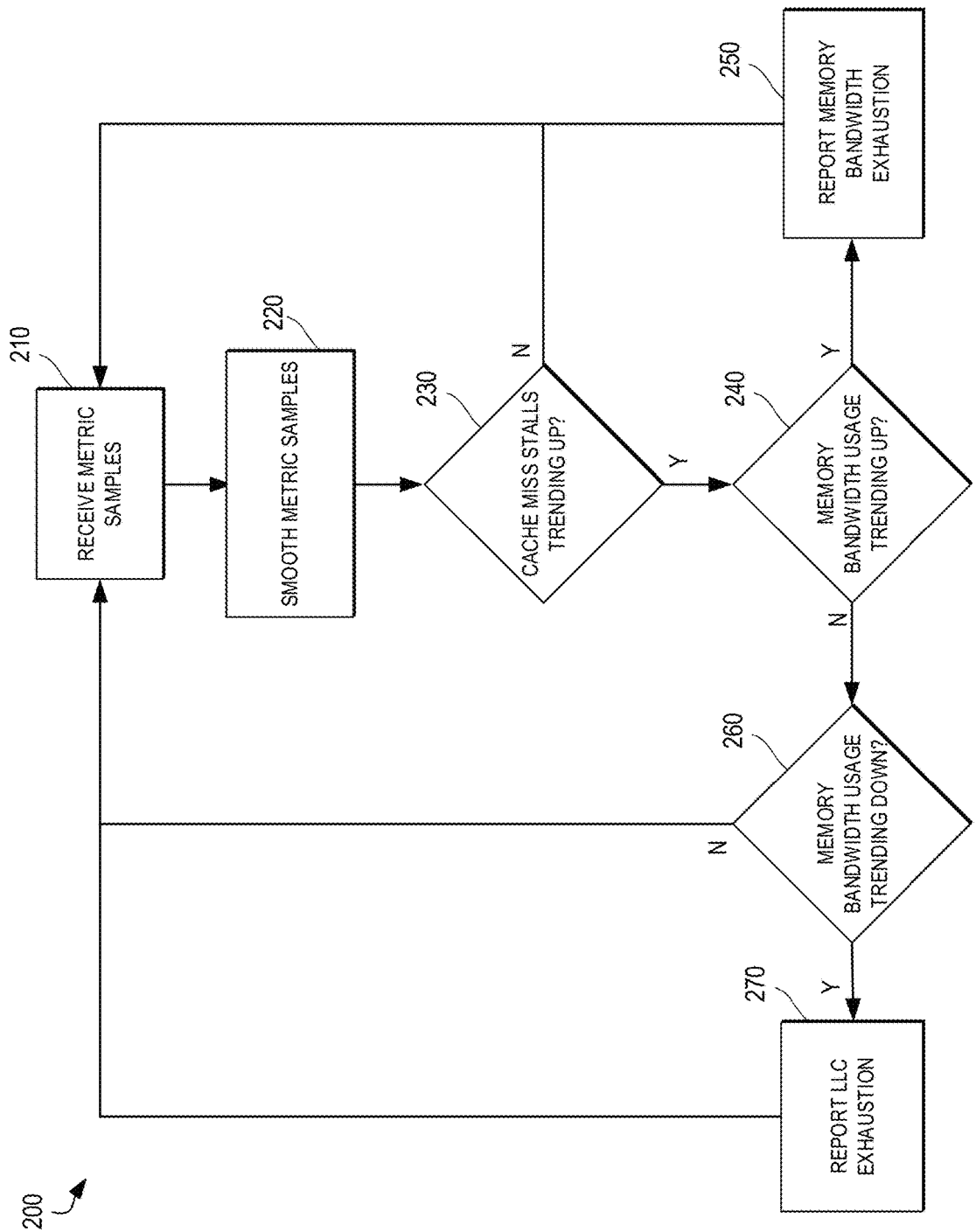
FIG. 2 illustrates an example method to determine last level cache memory exhaustion or memory bandwidth exhaustion for a processor unit.

FIG. 2 illustrates an example method to determine last level cache memory exhaustion or memory bandwidth exhaustion for a processor unit. The method 200 can be performed by, for example, a resource exhaustion detector (e.g., detector 152). At 210, cache miss stall metric samples and memory bandwidth usage metric samples are received by the component performing the method 200. For example, a resource exhaustion detector can receive these metric samples by pulling the samples from a performance monitor or by the performance monitor pushing the metric samples to the detector. At 220, the cache miss stall metric samples and the memory bandwidth metric samples are smoothed. In some embodiments, smoothing metric samples comprises calculating a metric sample average for a metric over the last N received metric samples, where N can be any number (e.g., 3, 5, 10, 20). At 230, a determination is made whether cache miss stalls are trending up based on the smoothed cache miss stall metric samples (e.g., cache miss stall metric sample averages).

For any elements in the method 200 that comprise determining whether the metric samples are trending upward, this determination can be made by, for example, fitting a linear model to the M (M=2, 5, 10, etc.) smoothed metric samples associated with the most recently received metric samples and determining whether the fitted linear model has a positive slope, or, by determining whether, over the M smoothed metric samples, more than a threshold number of successive smoothed metric samples have increased. As an example of the former, if the smoothed metric samples are sample averages, determining whether the metric is trending up can comprise determining that a linear model fitted to the most recently calculated 20 metric sample averages has a positive slope. As an example of the latter, if the smoothed metric samples metric are sample averages, determining whether the metric is trending up can comprise determining that, over the most recently calculated 20 metric sample averages, successive metric sample averages have increased in value at least 70% of the time. Other threshold amounts (e.g., 60%, 80%) could be used. Similar approaches can be used in the method 200 to determine whether a metric is trending down (e.g., a fitted linear model has a negative slope, more than a threshold number of successive smoothed metric samples show a decrease over M samples). Other approaches can be used to determine whether smoothed metric samples are trending up or down If cache miss stalls are trending up, this indicates a possible resource exhaustion condition and the method proceeds to 240. At 240, a determination is made whether memory usage bandwidth is trending up based on the smoothed memory bandwidth usage metric samples. If cache miss stalls are trending up and memory bandwidth usage is trending up, the metrics suggest that the processor unit is experiencing a memory bandwidth exhaustion condition and the method 200 reports the presence of a memory bandwidth exhaustion condition at 250 (e.g., resource exhaustion detector 152 reports a memory bandwidth exhaustion condition to the resource controller 156).

If memory bandwidth usage is not trending up, the method proceeds to 260 where a determination is made whether memory usage bandwidth is trending down based on the smoothed memory bandwidth usage metric samples. If cache miss stalls are trending up and memory bandwidth usage is trending down, the metrics suggest that the processor unit is experiencing an LLC exhaustion condition and the method 200 reports the presence of an LLC exhaustion condition at 270 (e.g., resource exhaustion detector 152 reports an LLC exhaustion condition to resource controller 156). If cache miss stalls are not trending up, or cache miss stalls are trending up and memory bandwidth usage is neither trending up or down, the method 200 returns to 210 and continues to monitor received metric samples for resource exhaustion conditions.

In some embodiments, multiple cache miss stall metrics can be used in determining whether cache miss stalls are trending up. In such embodiments, cache miss stalls can be determined to be trending up if each cache miss stall metric is trending up. In some embodiments, cache miss stall metrics for multiple levels of cache can be used in determining whether cache miss stalls are trending up. For example, the resource exhaustion detector 152 can determine whether cache miss stalls are trending up based on a first cache miss stall metric reflecting the number of processor unit stall cycles performed while L2 cache miss demand loads are outstanding within a reporting period and a second cache miss stall metric reflecting the number of processor unit stall cycles performed while LLC cache miss demand loads are outstanding within the porting period. Similarly, multiple memory bandwidth usage metrics can be used in determining whether memory bandwidth usage is trending up or down and memory bandwidth usage can be determined to be trending up or down if each cache memory bandwidth metric is trending up or down.

The resource exhaustion detector 152 can further determine whether to rebalance traffic provided by the traffic source 144 to the various components to which it provides traffic based on the metric samples 154 received from the performance monitor 122. If the resource exhaustion detector 152 determines that a processor unit is overloaded due to the last-level cache or memory bandwidth being exhausted, the resource exhaustion detector 152 can determine whether to report that a traffic rebalancing is to be performed based on one or more bandwidth-related metrics to remediate the resource exhaustion condition.

In some embodiments, the resource exhaustion detector 152 determines whether traffic rebalancing is to be performed by determining that a ratio of a total traffic bandwidth delivered by the traffic source to all components receiving traffic from the traffic source to a memory bandwidth used by the limited processor unit to exceeds a traffic rebalancing threshold. In other embodiments, the resource exhaustion detector 152 determines whether traffic rebalancing is to be performed by determining that a ratio of the total traffic bandwidth delivered by the traffic source to a maximum memory bandwidth allocated to the limited processor unit exceeds a traffic rebalancing threshold. In other embodiments, the resource exhaustion detector 152 can determine whether traffic rebalancing is to be performed by determining that the ratio of memory bandwidth usage of the limited processor unit to a maximum memory bandwidth allocated to the processor unit exceeds a traffic rebalancing threshold ratio. If any of these ratios exceed the indicated threshold (the traffic rebalancing threshold can be different for each of these three ratios), then the amount of incoming traffic to the limited processor unit is a probable cause for the resource exhaustion condition and traffic rebalancing can be taken as a remedial solution.

In some embodiments, the resource exhaustion detector 152 can determine to rebalance traffic based on a single network-related metric. For example, the resource exhaustion detector 152 can determine to rebalance traffic if a total traffic bandwidth metric sample associated with a traffic source providing traffic to the processor unit, a memory bandwidth usage metric sample associated with the limited processor unit, or a maximum memory bandwidth allocated to the limited processor unit metric value exceeds a corresponding traffic rebalancing threshold (the traffic rebalancing threshold for each of these three metric samples/values can be different).

In some embodiments, determining whether to rebalance traffic can be based on discrete metric samples or smoothed metric samples. Smoothed metric samples used in determining whether to perform traffic rebalancing can be smoothed as described above in regard to determining whether a last level cache or memory bandwidth resource exhaustion condition is present. For example, the resource exhaustion detector 152 can determine whether traffic rebalancing should be performed based on smoothed metric samples that are calculated by determining a metric sample average for every N metric samples provided by the performance monitor.

If the resource exhaustion detector 152 determines that traffic is to be rebalanced, the exhaustion information 160 sent to the resource controller 156 comprises information causing the resource controller 156 to take a traffic rebalancing remedial action. Various traffic rebalancing remedial actions can be taken by the resource controller 156. In some embodiments, the resource controller 156 can modify one or more traffic routing rules that specify which traffic received at the traffic source is to be routed to the processor unit. These rules can specify which receive queues traffic is to be routed to for use by a processor unit, with each receive queue corresponding to a processor unit. Modifying traffic routing rules can comprise, in a hardware-based solution, modifying entries in a receive-side scaling (RSS) indirection table or modifying Intel® Ethernet Flow Director rules. In a software-based solution, modifying traffic routing rules can comprise modifying rules in a Linux® Receive Packet Steering or Linux® Receive Packet Steering implementation. In some embodiments, modifying traffic routing rules can comprise modifying a Programming Protocol-independent Packet Processors (P4) program, a Network Programming Language (NPL) program, or a Berkeley Packet Filtering (BPF) instruction set. The traffic rebalancing remedial action can result in the traffic source sending at least a portion of the high bandwidth traffic that was being sent to a limited core to a lightly loaded core that was receiving lower bandwidth traffic from the traffic source. For example, if the traffic source 144 is a NIC that is delivering traffic high bandwidth to the core 116 and low bandwidth traffic to the core 119 prior to the traffic rebalancing, the resource controller 156 can modify entries in an RSS indirection table to cause at least a portion of the high bandwidth traffic to be redirected from the overloaded core 116 to the lightly loaded core 119.

In some embodiments, the resource controller 156 rebalances traffic to the processor unit by rerouting low priority traffic to a second processor unit. As an example of priorities being assigned to traffic, traffic sent to the computing system 104 over an Ethernet connection can have a low priority according to a priority flow control scheme. Traffic can be deemed by the resource controller 156 to have a low priority if the traffic priority has, for example, the lowest priority or a priority in the bottom half of priorities in a priority scheme.

A traffic rebalancing remedial action can comprise rerouting a portion of the traffic that was directed to a limited processor unit to a second processor unit. The second processor unit can be located in the same computing system as the limited processor unit (e.g., in one of the additional integrated circuit components 112) or a different computing system (e.g., one of the additional computing systems 108). If the computing system 104 is part of a first virtual local area network (VLAN) network, the different computing system can be part of a second VLAN.

In some embodiments, the traffic rebalancing remediation action can comprise configuring the network component 106 to limit the rate of incoming traffic to the computing system 104. The network component 106 can be configured to limit the rate of all packets provided by the network component 106 to the traffic source 144 or limit the rate of packets associated with particular flows, such as low-priority flows.

In some embodiments, the traffic rebalancing remediation action can comprise utilizing a load distributor in a single root-software-I/O virtualization (SR-IOV) implementation to redistribute packets from a limited processor unit executing a PCIe physical function to another processor unit. In some embodiments, a traffic rebalancing remediation action can be performed utilizing a hardware queue manager or the Intel® data plane development kit (DPDK)'s ordered packet distribution list (OPDL) scheduler.

Figure 3:
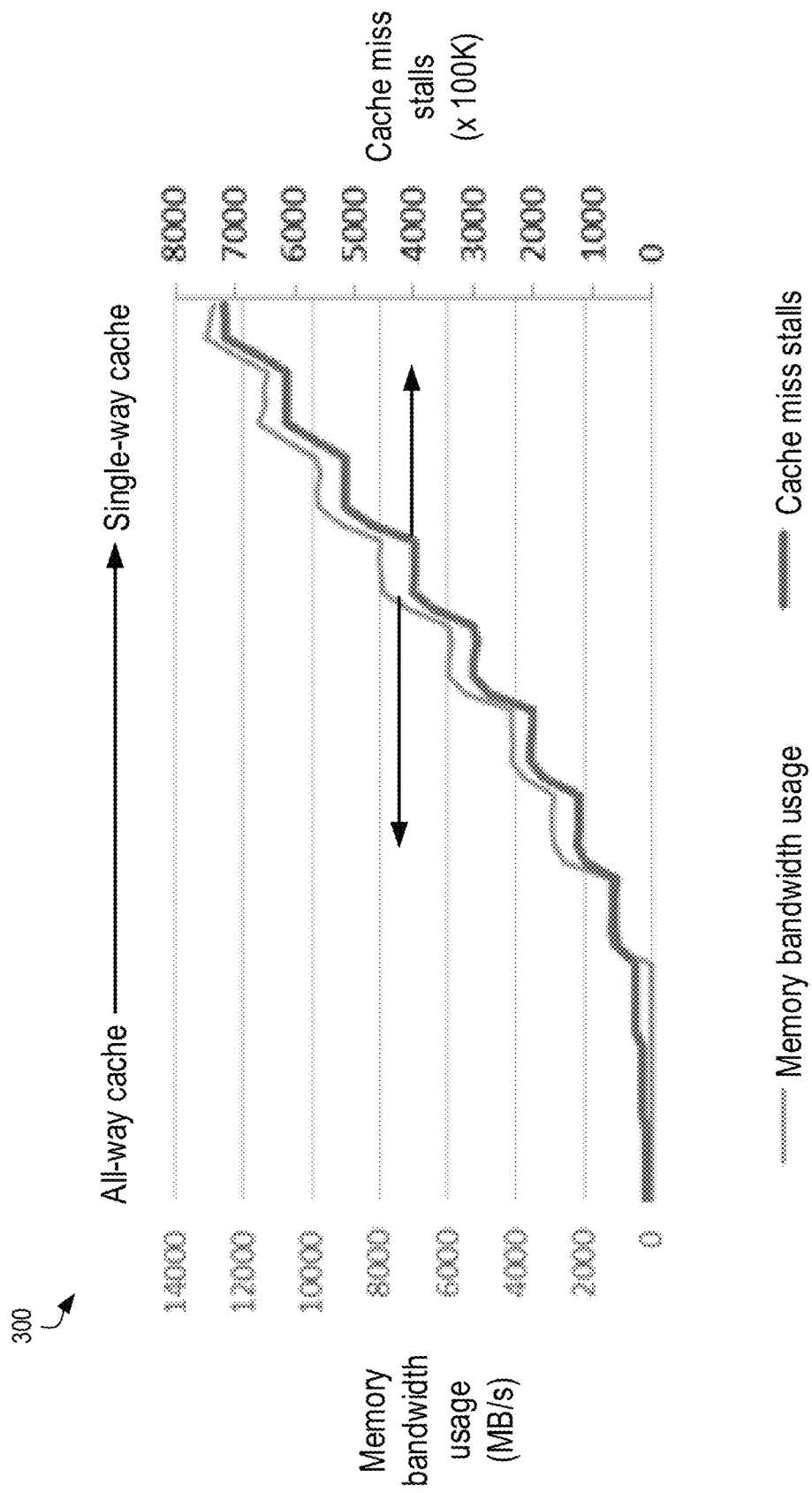
FIG. 3 is a graph illustrating the correlation between cache miss stalls and memory bandwidth usage metrics and cache exhaustion.

FIG. 3 is a graph illustrating the correlation between cache miss stalls and memory bandwidth usage metrics and LLC exhaustion. The graph 300 shows memory bandwidth usage (left y-axis) and cache miss stalls (right y-axis) for a processor unit as the number of ways in the last-level cache available to an application executing on the processor unit is gradually reduced (x-axis). The graph 300 shows that gradually reducing the number of ways in the LLC, which increases the likelihood of cache misses, results in corresponding gradual increases in the number of execution stalls performed by the processor unit due to last-level cache misses and in the amount of memory bandwidth used by the processor unit. Thus, detecting upward trends in both cache miss stalls and memory bandwidth usage metrics can indicate that processor unit performance is being limited due to LLC exhaustion.

Figure 4:
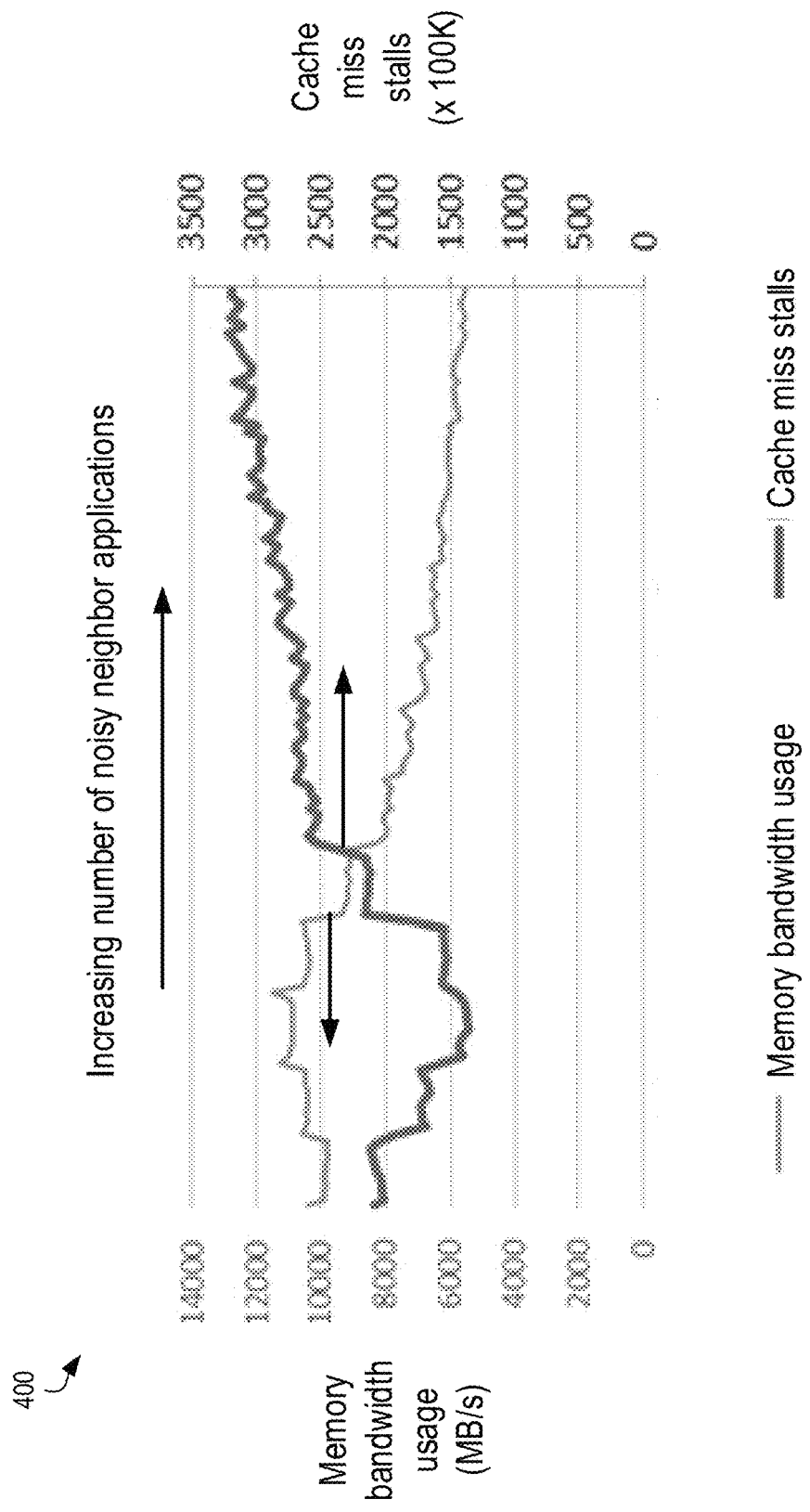
FIG. 4 is a graph illustrating the correlation between cache miss stalls and memory bandwidth usage metrics and memory bandwidth exhaustion.

FIG. 4 is a graph illustrating the correlation between cache miss stalls and memory bandwidth usage metrics and memory bandwidth exhaustion. The graph 400 shows memory bandwidth usage (left y-axis) and cache miss stalls (right y-axis) for a processor unit executing a memory-bound application as the number of noisy neighbor applications are gradually increased (x-axis) to increase memory bandwidth contention. The graph 400 shows that gradually increasing the number of noisy neighbor applications results in a corresponding gradual increase in the number of execution stalls in the processor unit due to last-level cache misses, which increase as more noisy neighbors are introduced due to more memory bandwidth being consumed by the noisy neighbor applications and a corresponding decrease in the amount of memory bandwidth used by the application. Thus, detecting an upward trend in a cache miss stall metric and a downward trend in a memory bandwidth usage metric can indicate that processor unit performance is being limited due to memory bandwidth exhaustion.

The resource exhaustion and detection technologies described herein have at least the following advantages. First, a resource exhaustion detector is disclosed that provides new metrics indicating when a processor unit is experiencing a last-level cache or memory bandwidth exhaustion condition. These new metrics can provide increased insight into platform resource utilization. Second, resource configuration is simplified by providing a closed-loop solution. Shared resource usage is automatically monitored, exhaustion conditions are automatically detected, and remedial actions are automatically taken to address exhaustion conditions. Third, by providing an automated resource management solution, the disclosed technologies assist in ensuring that the quality of service (QoS) that a provider is obligated to provide to a customer based on a service level agreement (SLA) is met. For example, high priority workloads are more protected from resource exhaustion conditions.

Figure 5:
FIG. 5 is an example resource exhaustion detection and remediation method.

FIG. 5 is an example resource exhaustion detection and remediation method. The method 500 can be performed by any computing system described or referenced herein, such as a server. At 510, a resource exhaustion condition is detected. The resource exhaustion condition is detected in response to: at 520, determining that cache miss stalls for a processor unit are trending up; and, at 530, determining the memory bandwidth usage for the processor unit is trending up or trending down. At 540, a remedial action is caused to be taken in response to detecting the resource exhaustion condition.

In other embodiments, the method 500 can comprise one or more additional elements. For example, the resource exhaustion condition can be detected in further response to determining that a ratio of a memory bandwidth usage of the processor unit to a total traffic bandwidth generated by the traffic source exceeds a traffic rebalancing threshold.

The performance monitors, resource exhaustion detectors, and resource controllers described herein can be referred to as a module (e.g., performance monitor module, resource exhaustion detector module, resource controller module). As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer-readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hardwired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as performance monitor circuitry, etc. A computer device referred to as being programmed to perform a method can be programmed to perform the method via software, hardware, firmware, or combinations thereof.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

Figure 6:
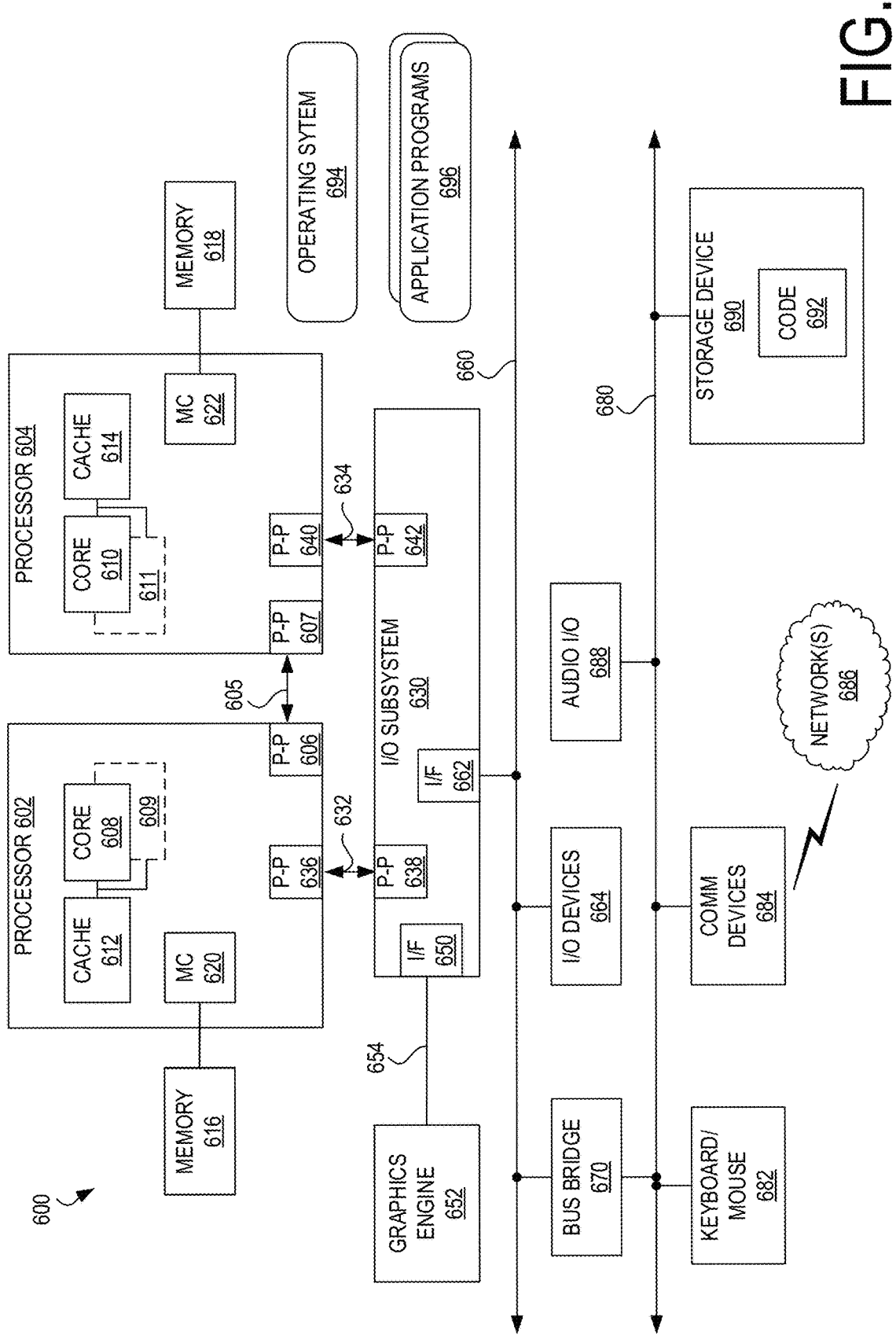
FIG. 6 is a block diagram of an example computing system in which technologies described herein may be implemented.

FIG. 6 is a block diagram of an example computing system in which technologies described herein may be implemented. Generally, components shown in FIG. 6 can communicate with other shown components, although not all connections are shown, for ease of illustration. The computing system 600 is a multiprocessor system comprising a first processor unit 602 and a second processor unit 604 comprising point-to-point (P-P) interconnects. A point-to-point (P-P) interface 606 of the processor unit 602 is coupled to a point-to-point interface 607 of the processor unit 604 via a point-to-point interconnection 605. It is to be understood that any or all of the point-to-point interconnects illustrated in FIG. 6 can be alternatively implemented as a multi-drop bus, and that any or all buses illustrated in FIG. 6 could be replaced by point-to-point interconnects.

The processor units 602 and 604 comprise multiple processor cores. Processor unit 602 comprises processor cores 608 and processor unit 604 comprises processor cores 610. Processor cores 608 and 610 can execute computer-executable instructions in a manner similar to that discussed below in connection with FIG. 7, or other manners.

Processor units 602 and 604 further comprise cache memories 612 and 614, respectively. The cache memories 612 and 614 can store data (e.g., instructions) utilized by one or more components of the processor units 602 and 604, such as the processor cores 608 and 610. The cache memories 612 and 614 can be part of a memory hierarchy for the computing system 600. For example, the cache memories 612 can locally store data that is also stored in a memory 616 to allow for faster access to the data by the processor unit 602. In some embodiments, the cache memories 612 and 614 can comprise multiple cache levels, such as level 1 (L1), level 2 (L2), level 3 (L3), level 4 (L4), and/or other caches or cache levels, such as a last-level cache (LLC). Some of these cache memories (e.g., L2, L3, L4, LLC) can be shared among multiple cores in a processor unit. One or more of the higher levels of cache levels (the smaller and faster caches) in the memory hierarchy can be located on the same integrated circuit die as a processor core and one or more of the lower cache levels (the larger and slower caches) can be located on an integrated circuit dies that are physically separate from the processor core integrated circuit dies.

Although the computing system 600 is shown with two processor units, the computing system 600 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processor units. As such, the processor unit can be referred to as an XPU (or xPU). Further, a processor unit can comprise one or more of these various types of processor units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 600 can comprise one or more processor units that are heterogeneous or asymmetric to another processor unit in the computing system. There can be a variety of differences between the processor units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 602 and 604 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetric can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 602 and 604 further comprise memory controller logic (MC) 620 and 622. As shown in FIG. 6, MCs 620 and 622 control memories 616 and 618 coupled to the processor units 602 and 604, respectively. The memories 616 and 618 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 620 and 622 are illustrated as being integrated into the processor units 602 and 604, in alternative embodiments, the MCs can be external to a processor unit.

Processor units 602 and 604 are coupled to an Input/Output (I/O) subsystem 630 via point-to-point interconnections 632 and 634. The point-to-point interconnection 632 connects a point-to-point interface 636 of the processor unit 602 with a point-to-point interface 638 of the I/O subsystem 630, and the point-to-point interconnection 634 connects a point-to-point interface 640 of the processor unit 604 with a point-to-point interface 642 of the I/O subsystem 630. Input/Output subsystem 630 further includes an interface 650 to couple the I/O subsystem 630 to a graphics engine 652. The I/O subsystem 630 and the graphics engine 652 are coupled via a bus 654.

The Input/Output subsystem 630 is further coupled to a first bus 660 via an interface 662. The first bus 660 can be a Peripheral Component Interconnect Express (PCIe) bus or any other type of bus. Various I/O devices 664 can be coupled to the first bus 660. A bus bridge 670 can couple the first bus 660 to a second bus 680. In some embodiments, the second bus 680 can be a low pin count (LPC) bus. Various devices can be coupled to the second bus 680 including, for example, a keyboard/mouse 682, audio I/O devices 688, and a storage device 690, such as a hard disk drive, solid-state drive, or another storage device for storing computer-executable instructions (code) 692 or data. The code 692 can comprise computer-executable instructions for performing methods described herein. Additional components that can be coupled to the second bus 680 include communication device(s) 684, which can provide for communication between the computing system 600 and one or more wired or wireless networks 686 (e.g., Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 602.11 standard and its supplements).

In embodiments where the communication devices 684 support wireless communication, the communication devices 684 can comprise wireless communication components coupled to one or more antennas to support communication between the computing system 600 and external devices. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 600 can comprise removable memory such as flash memory cards (e.g., SD (Secure Digital) cards), memory sticks, Subscriber Identity Module (SIM) cards). The memory in system 600 (including caches 612 and 614, memories 616 and 618, and storage device 690) can store data and/or computer-executable instructions for executing an operating system 694 and application programs 696. Example data includes web pages, text messages, images, sound files, and video to be sent to and/or received from one or more network servers or other devices by the system 600 via the one or more wired or wireless networks 686, or for use by the system 600. The system 600 can also have access to external memory or storage (not shown) such as external hard drives or cloud-based storage.

The operating system 694 can control the allocation and usage of the components illustrated in FIG. 6 and support the one or more application programs 696. The application programs 696 can include common computing system applications (e.g., email applications, calendars, contact managers, web browsers, messaging applications) as well as other computing applications.

The computing system 600 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 600. External input and output devices can communicate with the system 600 via wired or wireless connections.

In addition, the computing system 600 can provide one or more natural user interfaces (NUIs). For example, the operating system 694 or applications 696 can comprise speech recognition logic as part of a voice user interface that allows a user to operate the system 600 via voice commands. Further, the computing system 600 can comprise input devices and logic that allows a user to interact with computing the system 600 via body, hand, or face gestures.

The system 600 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 600 can further comprise one or more additional antennas coupled to one or more additional receivers, transmitters, and/or transceivers to enable additional functions.

It is to be understood that FIG. 6 illustrates only one example computing system architecture. Computing systems based on alternative architectures can be used to implement technologies described herein. For example, instead of the processors 602 and 604 and the graphics engine 652 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 6. Moreover, the illustrated components in FIG. 6 are not required or all-inclusive, as shown components can be removed and other components added in alternative embodiments.

Figure 7:
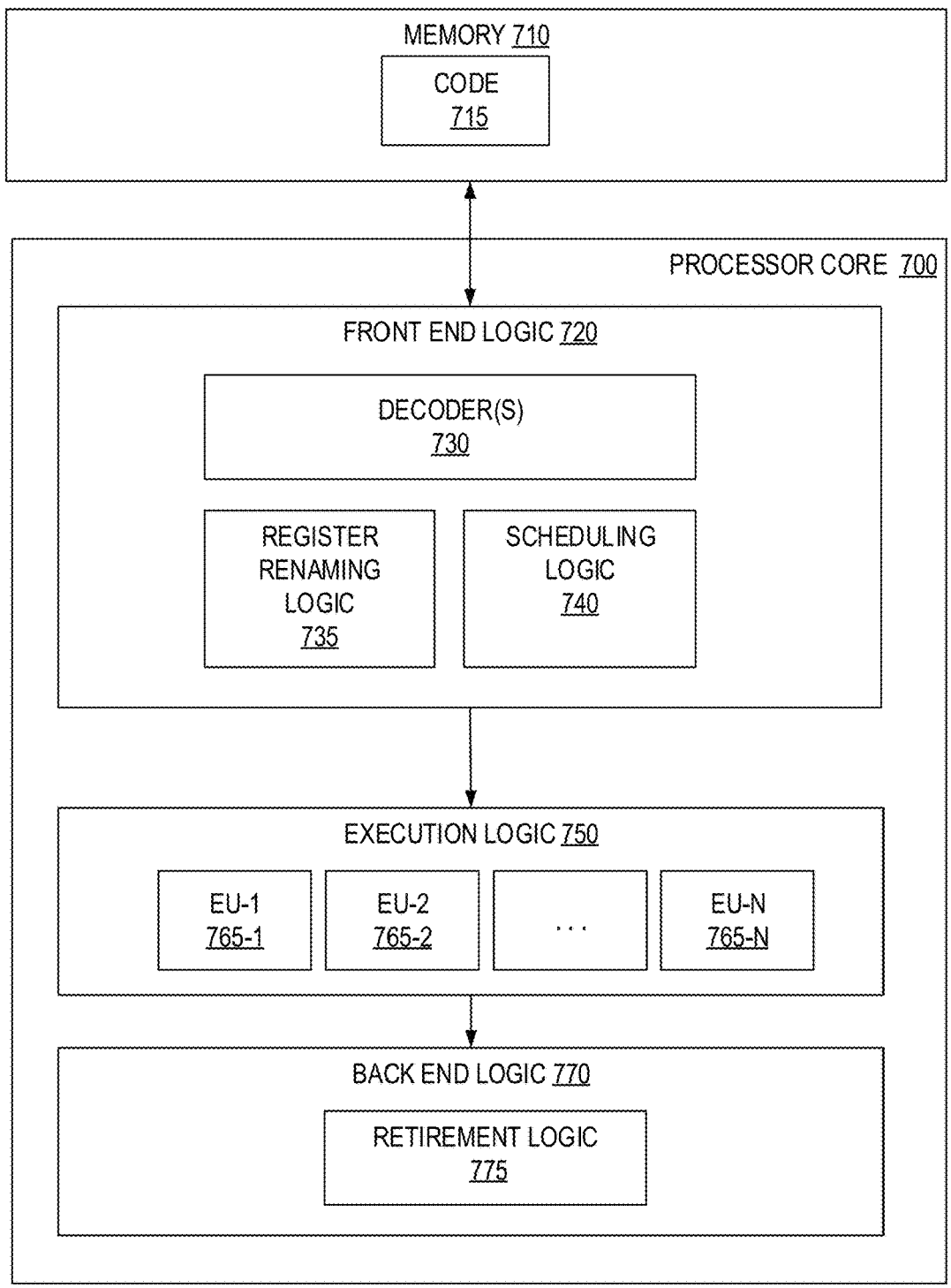
FIG. 7 is a block diagram of an example processor unit to execute computer-executable instructions as part of implementing technologies described herein.

FIG. 7 is a block diagram of an example processor unit 700 to execute computer-executable instructions as part of implementing technologies described herein. The processor unit 700 can be a single-threaded core or a multithreaded core in that it may include more than one hardware thread context (or "logical processor") per processor unit.

FIG. 7 also illustrates a memory 710 coupled to the processor unit 700. The memory 710 can be any memory described herein or any other memory known to those of skill in the art. The memory 710 can store computer-executable instructions 715 (code) executable by the processor core 700.

The processor unit comprises front-end logic 720 that receives instructions from the memory 710. An instruction can be processed by one or more decoders 730. The decoder 730 can generate as its output a micro-operation such as a fixed width micro operation in a predefined format, or generate other instructions, microinstructions, or control signals, which reflect the original code instruction. The front-end logic 720 further comprises register renaming logic 735 and scheduling logic 740, which generally allocate resources and queues operations corresponding to converting an instruction for execution.

The processor unit 700 further comprises execution logic 750, which comprises one or more execution units (EUs) 765-1 through 765-N. Some processor unit embodiments can include a number of execution units dedicated to specific functions or sets of functions. Other embodiments can include only one execution unit or one execution unit that can perform a particular function. The execution logic 750 performs the operations specified by code instructions. After completion of execution of the operations specified by the code instructions, back-end logic 770 retires instructions using retirement logic 775. In some embodiments, the processor unit 700 allows out of order execution but requires in-order retirement of instructions. Retirement logic 775 can take a variety of forms as known to those of skill in the art (e.g., re-order buffers or the like).

The processor unit 700 is transformed during execution of instructions, at least in terms of the output generated by the decoder 730, hardware registers and tables utilized by the register renaming logic 735, and any registers (not shown) modified by the execution logic 750.

As used herein, the term "module" refers to logic that may be implemented in a hardware component or device, software or firmware running on a processor unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processor units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processor units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method, comprising: detecting a resource exhaustion condition in response to: (i) determining that cache miss stalls for a processor unit are trending up; and (ii) determining that memory bandwidth usage for the processor unit is trending up or trending down; and causing a remedial action to be taken in response to detecting the resource exhaustion condition.

Example 2 comprises the method of Example 1, wherein the resource exhaustion condition is detected in response to determining that the cache miss stalls for the processor unit are trending up and that the memory bandwidth usage is trending up, the remedial action comprising allocating additional memory bandwidth for use by the processor unit.

Example 3 comprises the method of Example 2, the allocating additional memory bandwidth for the processor unit comprising reallocating memory bandwidth allocated to a second processor unit to the processor unit.

Example 4 comprises the method of Example 3, wherein the second processor unit is a low priority processor unit.

Example 5 comprises the method of Example 3, the allocating additional memory bandwidth for the processor unit further comprising designating the second processor unit a low priority processor unit.

Example 6 comprises the method of any one of Example 1-5, wherein the resource exhaustion condition is detected in response to determining that the cache miss stalls for the processor unit are trending up and that the memory bandwidth usage is trending down, the remedial action comprising allocating additional last-level cache for use by the processor unit.

Example 7 comprises the method of Example 6, the allocating additional last-level cache for use by the processor unit comprising reallocating cache allocated to a second processor unit to the processor unit.

Example 8 comprises the method of Example 7, wherein the second processor unit is a low priority processor unit.

Example 9 comprises the method of Example 7, the allocating additional last-level cache for the processor unit further comprising designating the second processor unit a low priority processor unit.

Example 10 comprises the method of any one of Examples 1-9, wherein the determining that the cache miss stalls for the processor unit are trending up is based on cache miss stall metric samples.

Example 11 comprises the method of Example 10, wherein the determining that the cache miss stalls for the processor unit are trending up is based on a plurality of cache miss stall metric sample averages, individual of the cache miss stall metric sample averages determined from a plurality of cache miss stall metric samples.

Example 12 comprises the method of any one of Examples 1-11, wherein the determining that the memory bandwidth usage for the processor unit is trending up or trending down is based on memory bandwidth usage metric samples.

Example 13 comprises the method of Example 12, wherein the determining that the memory bandwidth usage for the processor unit is trending up or trending down is based on a plurality of memory bandwidth usage metric sample averages, individual of the memory bandwidth usage metric sample averages determined from a plurality of memory bandwidth usage metric samples.

Example 14 comprises the method of any one of Examples 1-13, wherein the remedial action comprises assigning a high priority to an application executing on the processor unit or increasing a priority assigned to the application.

Example 15 comprises the method of any one of Examples 1-14, wherein the remedial action comprises assigning a high priority to or increasing a priority assigned to a class of applications to which an application executing on the processor unit belongs.

Example 16 comprises the method of any one of Examples 1-15, wherein the remedial action comprises moving an application executing on the processor unit from a first socket to a second socket.

Example 17 comprises the method of any one of Examples 1-16, wherein the remedial action comprises increasing an operating frequency of the processor unit.

Example 18 comprises the method of any one of Examples 1-17, wherein the remedial action comprises increasing an operating voltage of the processor unit.

Example 19 comprises the method of any one of Examples 1-18, wherein the remedial action comprising scaling up a number of processor units executing an application executing on the processor unit.

Example 20 comprises the method of any one of Examples 1-19, wherein the processor unit is executing an application within a container environment executing on a computing system and the remedial action comprises scaling up a number of container instances executing on the computing system that are executing the application.

Example 21 comprises the method of any one of Examples 1-20, wherein the resource exhaustion condition is detected in further response to: (iii) determining that a ratio of a total traffic bandwidth generated by a traffic source to a memory bandwidth usage of the processor unit exceeds a traffic rebalancing threshold.

Example 22 comprises the method of any one of Examples 1-20, wherein the resource exhaustion condition is detected in further response to: (iii) determining that a ratio of a total traffic bandwidth generated by a traffic source to a maximum memory bandwidth allocated to the processor unit exceeds a traffic rebalancing threshold.

Example 23 comprises the method of any one of Examples 1-20, wherein the resource exhaustion condition is detected in further response to: (iii) determining that a ratio of a memory bandwidth usage of the processor unit to a maximum memory bandwidth allocated to the processor unit exceeds a traffic rebalancing threshold.

Example 24 comprises the method of any one of Examples 1-20, wherein the resource exhaustion condition is detected in further response to: (iii) determining that a total traffic bandwidth metric sample associated with a traffic source providing traffic to the processor unit exceeds a traffic rebalancing threshold.

Example 25 comprises the method of any one of Examples 1-20, wherein the resource exhaustion condition is detected in further response to: (iii) determining that a memory bandwidth usage associated with the processor unit exceeds a traffic rebalancing threshold.

Example 26 comprises the method of any one of Examples 1-20, wherein the resource exhaustion condition is detected in further response to: (iii) determining that a maximum memory bandwidth allocated to the processor unit exceeds a traffic rebalancing threshold.

Example 27 comprises the method of any one of Examples 21-26, wherein the remedial action comprises modifying one or more traffic routing rules that specify which traffic received at the traffic source is to be routed to the processor unit.

Example 28 comprises the method of Example 27, wherein the modifying the one or more traffic routing rules that specify which traffic received at the traffic source is routed to the processor unit comprises modifying one or more receive-side scaling indirection table entries.

Example 29 comprises the method of Example 27, wherein the modifying the one or more traffic routing rules that specify which traffic received at the traffic source is routed to the processor unit comprises modifying one or more flow director rules.

Example 30 comprises the method of Example 27, wherein the modifying the one or more traffic routing rules that specify which traffic received at the traffic source is routed to the processor unit comprises rerouting low priority traffic to a second processor unit.

Example 31 comprises the method of any one of Examples 21-26, wherein the remedial action comprises redirecting at least a portion of the traffic provided by the traffic source to the processor unit be to a second processor unit.

Example 32 comprises the method of Example 31, wherein the processor unit is located in a first computing system and the second processor unit is located in a second computing system.

Example 33 comprises the method of Example 32, wherein the processor unit is located in a computing system that is part of a first virtual local area network (VLAN) and the second computing system is part of a second VLAN.

Example 34 comprises the method of any one of Examples 21-26, wherein the processor unit is located in a computing system and remedial action comprises configuring a network component to limit a rate of incoming traffic to the computing system.

Example 35 comprises the method of any one of Examples 21-26, wherein the remedial action is taken by a software-defined network controller.

Example 36 comprises the method of any one of Examples 21-26, wherein the remedial action is performed by a hardware queue manager.

Example 37 is a computing system comprising: an integrated circuit component comprising a processor unit; a resource exhaustion detector to detect a resource exhaustion condition in response to: (i) determining that cache miss stalls for the processor unit are trending up; and (ii) determining that memory bandwidth usage for the processor unit is trending up or trending down; and a resource controller to cause a remedial action to be taken in response to detection of the resource exhaustion condition.

Example 38 comprises the computing system of Example 37, wherein the resource exhaustion condition is detected in response to determining that the cache miss stalls for the processor unit arc trending up and that the memory bandwidth usage is trending up, the remedial action comprising to allocate additional memory bandwidth for use by the processor unit.

Example 39 comprises the computing system of Example 38, to allocate additional memory bandwidth for the processor unit comprising to reallocate memory bandwidth allocated to a second processor unit to the processor unit.

Example 40 comprises the computing system of Example 39, wherein the second processor unit is a low priority processor unit.

Example 41 comprises the computing system of Example 39, to allocate additional memory bandwidth for the processor unit further comprising to designate the second processor unit as a low priority processor unit.

Example 42 comprises the computing system of any one of Examples 37-41, wherein the resource exhaustion condition is detected in response to determining that the cache miss stalls for the processor unit are trending up and that the memory bandwidth usage is trending down, the remedial action comprising to allocate additional last-level cache for use by the processor unit.

Example 43 comprises the computing system of Example 42, to allocate additional last-level cache for use by the processor unit comprising to reallocate cache allocated to a second processor unit to the processor unit.

Example 44 comprises the computing system of Example 43, wherein the second processor unit is a low priority processor unit.

Example 45 comprises the computing system of Example 43, to allocate additional last-level cache for the processor unit further comprising to designate the second processor unit as a low priority processor unit.

Example 46 comprises the computing system of any one of Examples 37-45, wherein the determining that cache miss stalls for the processor unit are trending up is based on cache miss stall metric samples.

Example 47 comprises the computing system of Example 46, further comprising a performance monitor to provide the cache miss stall metric samples to the resource exhaustion detector.

Example 48 comprises the computing system of Example 46, wherein the determining that cache miss stalls for the processor unit are trending up is based on a plurality of cache miss stall metric sample averages, individual of the cache miss stall metric sample averages determined from a plurality of cache miss stall metric samples.

Example 49 comprises the computing system of any one of Examples 37-48, wherein the determining that memory bandwidth usage for the processor unit is trending up or trending down is based on memory bandwidth usage metric samples.

Example 50 comprises the computing system of Example 49, further comprising a performance monitor to provide the memory bandwidth usage metric samples to the resource exhaustion detector.

Example 51 comprises the computing system of any one of Examples 37-50, wherein the determining that memory bandwidth usage for the processor unit is trending up or trending down is based on a plurality of memory bandwidth usage metric sample averages, individual of the memory bandwidth usage metric sample averages determined from a plurality of memory bandwidth usage metric samples.

Example 52 comprises the computing system of any one of Examples 37-51, wherein the remedial action comprises to assign a high priority to an application executing on the processor unit or to increase a priority assigned to the application.

Example 53 comprises the computing system of any one of Examples 37-52, wherein the remedial action comprises to assign a high priority to a class of applications to which an application executing on the processor unit belongs or to increase a priority assigned to the class of applications.

Example 54 comprises the computing system of any one of Examples 37-53, further comprising a traffic source to provide traffic to the processor unit, the resource exhaustion detector to detect the resource exhaustion condition in further response to: (iii) determining that a ratio of a total traffic bandwidth generated by the traffic source to a memory bandwidth usage of the processor unit exceeds a traffic rebalancing threshold.

Example 55 comprises the computing system of any one of Examples 37-53, further comprising a traffic source to provide traffic to the processor unit, the resource exhaustion detector to detect the resource exhaustion condition in further response to: (iii) determining that a ratio of a total traffic bandwidth generated by the traffic source to a maximum memory bandwidth allocated to the processor unit exceeds a traffic rebalancing threshold.

Example 56 comprises the computing system of any one of Examples 37-53, further comprising a traffic source to provide traffic to the processor unit, the resource exhaustion detector to detect the resource exhaustion condition in further response to: (iii) determining that a ratio of a memory bandwidth usage of the processor unit to a maximum memory bandwidth allocated to the processor unit exceeds a traffic rebalancing threshold.

Example 57 comprises the computing system of any one of Examples 37-53, the resource exhaustion detector to detect the resource exhaustion condition in further response to: (iii) determining that a total traffic bandwidth metric associated with a traffic source providing traffic to the processor unit exceeds a traffic rebalancing threshold.

Example 58 comprises the computing system of any one of Examples 37-53, the resource exhaustion detector to detect the resource exhaustion condition in further response to: (iii) determining that a memory bandwidth usage associated with the processor unit exceeds a traffic rebalancing threshold.

Example 59 comprises the computing system of any one of Examples 37-53, the resource exhaustion detector to detect the resource exhaustion condition in further response to: (iii) determining that a maximum memory bandwidth allocated to the processor unit exceeds a traffic rebalancing threshold.

Example 60 comprises the computing system of any one of Examples 54-59, wherein the remedial action comprises to modify one or more traffic routing rules that specify which traffic received at the traffic source is to be routed to the processor unit.

Example 61 comprises the computing system of Example 60, wherein to modify the one or more traffic routing rules that specify which traffic received at the traffic source is routed to the processor unit comprises to modify one or more receive-side scaling indirection table entries.

Example 62 comprises the computing system of Example 60, wherein to modify the one or more traffic routing rules that specify which traffic received at the traffic source is routed to the processor unit comprises to modify one or more flow director rules.

Example 63 comprises the computing system of Example 60, wherein to modify the one or more traffic routing rules that specify which traffic received at the traffic source is routed to the processor unit comprises to route low priority traffic to a second processor unit.

Example 64 comprises the computing system of any one of Examples 54-59, wherein the remedial action to be taken comprises redirecting at least a portion of the traffic provided by the traffic source to the processor unit to a second processor unit.

Example 65 comprises the computing system of Example 64, wherein the second processor unit is located in a second computing system.

Example 66 comprises the computing system of Example 65, wherein the computing system is part of a first virtual local area network (VLAN) and the second computing system is part of a second VLAN.

Example 67 comprises the computing system of any one of Examples 54-59, wherein the remedial action comprises to configure a network component to limit a rate of incoming traffic to the computing system.

Example 68 comprises the computing system of any one of Examples 54-59, wherein the resource controller comprises a software-defined network controller, the software-defined network controller to cause the remedial action to be taken.

Example 69 comprises the computing system of any one of Examples 54-59, wherein the resource controller comprises a hardware queue manager, the hardware queue manager to cause the remedial action to be taken.

Example 70 comprises the computing system of any one of Examples 37-69, wherein the remedial action comprises to move an application executing on the processor unit from a first socket to a second socket.

Example 71 comprises the computing system of any one of Examples 37-70, wherein the remedial action comprises to increase an operating frequency of the processor unit.

Example 72 comprises the computing system of any one of Examples 37-71, wherein the remedial action comprises to increase an operating voltage of the processor unit.

Example 73 comprises the computing system of any one of Examples 37-72, wherein the remedial action comprises to scale up a number of processor units executing an application on the processor unit.

Example 74 comprises the computing system of any one of Examples 37-73, wherein the processor unit is to execute an application within a container environment and the remedial action comprises to scale up a number of container instances to execute the application on the computing system.

Example 75 is one or more non-transitory computer-readable storage media storing computer-executable instructions that, when executed, cause a computing system to perform any one of the methods of Examples 1-36.

Example 76 is a computing system comprising: a resource exhaustion detection means to detect exhaustion of last level cache or memory bandwidth for a processor unit; and a resource controller to take a remedial action in response to the resource exhaustion detection means detecting exhaustion of the last level cache or the memory bandwidth for the processor unit.

Example 77 is an apparatus comprising one or more means to perform any one of the method of Examples 1-36.

We claim:

1. A method, comprising:
   detecting a resource exhaustion condition in response to:
   (i) determining that cache miss stalls for a processor unit executing an application are trending up based on a plurality of cache miss stall metric samples; and
   (ii) determining that memory bandwidth usage for the processor unit executing the application is trending up or trending down based on a plurality of memory bandwidth usage metric samples, wherein individual of the plurality of memory bandwidth usage metric samples indicate a measure of memory bandwidth used by the processor unit executing the application; and causing a remedial action to be taken in response to detecting the resource exhaustion condition.

2. The method of claim 1, wherein the resource exhaustion condition is detected in response to determining that the cache miss stalls for the processor unit are trending up and determining that the memory bandwidth usage is trending up, the remedial action comprising allocating additional memory bandwidth for use by the processor unit.

3. The method of claim 2, the allocating additional memory bandwidth for the processor unit comprising reallocating memory bandwidth allocated to a second processor unit to the processor unit.

4. The method of claim 1, wherein the resource exhaustion condition is detected in response to determining that the cache miss stalls for the processor unit are trending up and determining that the memory bandwidth usage is trending down, the remedial action comprising allocating additional last-level cache for use by the processor unit.

5. The method of claim 4, the allocating additional last-level cache for use by the processor unit comprising reallocating cache allocated to a second processor unit to the processor unit.

6. The method of claim 1, wherein the processor unit is executing an application, the remedial action comprises scaling up a number of processor units executing the application.

7. The method of claim 1, wherein the resource exhaustion condition is detected in further response to: (iii) determining that a ratio of a total traffic bandwidth generated by a traffic source to a memory bandwidth usage of the processor unit exceeds a traffic rebalancing threshold.

8. The method of claim 7, wherein the remedial action comprises modifying one or more traffic routing rules that specify which traffic received at the traffic source is to be routed to the processor unit.

9. The method of claim 7, wherein the remedial action comprises redirecting at least a portion of traffic provided by the traffic source to the processor unit to a second processor unit.

10. The method of claim 1, wherein the plurality of cache miss stall metric samples comprises three or more cache miss stall metric samples and the plurality of memory bandwidth usage metric samples comprises three or more memory bandwidth usage metric samples.

11. A computing system comprising:
an integrated circuit component comprising a processor unit;
resource exhaustion detection circuitry to detect a resource exhaustion condition in response to:
(i) determining that cache miss stalls for the processor unit executing an application are trending up based on a plurality of cache miss stall metric samples; and
(ii) determining that memory bandwidth usage for the processor unit executing the application is trending up or trending down based on a plurality of memory bandwidth usage metric samples, wherein individual of the plurality of memory bandwidth usage metric samples indicate a measure of memory bandwidth used by the processor unit executing the application; and
a resource controller to cause a remedial action to be taken in response to detection of the resource exhaustion condition.

12. The computing system of claim 11, wherein the resource exhaustion condition is detected in response to determining that the cache miss stalls for the processor unit are trending up and that the memory bandwidth usage is trending up, the remedial action comprising to allocate additional memory bandwidth for use by the processor unit.

13. The computing system of claim 12, to allocate additional memory bandwidth for the processor unit comprising to reallocate memory bandwidth allocated to a second processor unit to the processor unit.

14. The computing system of claim 11, wherein the resource exhaustion condition is detected in response to determining that the cache miss stalls for the processor unit are trending up and that the memory bandwidth usage is trending down, the remedial action comprising to allocate additional last-level cache for use by the processor unit.

15. The computing system of claim 14, to allocate additional last-level cache for use by the processor unit comprising to reallocate cache allocated to a second processor unit to the processor unit.

16. One or more non-transitory computer-readable storage media storing computer-executable instructions that, when executed, cause a computing system to:
detect a resource exhaustion condition in response to:
(i) determining that cache miss stalls for a processor unit executing an application are trending up based on a plurality of cache miss stall metric samples; and
(ii) determining that memory bandwidth usage for the processor unit executing the application is trending up or trending down based on a plurality of memory bandwidth usage metric samples, wherein individual of the plurality of memory bandwidth usage metric samples indicate a measure of memory bandwidth used by the processor unit executing the application; and
cause a remedial action to be taken in response to detection of the resource exhaustion condition.

17. The one or more non-transitory computer-readable storage media of claim 16, wherein the resource exhaustion condition is detected in response to determining that the cache miss stalls for the processor unit are trending up and that the memory bandwidth usage is trending up, the remedial action comprising to allocate additional memory bandwidth for use by the processor unit.

18. The one or more non-transitory computer-readable storage media of claim 17, to allocate additional memory bandwidth for the processor unit comprising to reallocate memory bandwidth allocated to a second processor unit to the processor unit.

19. The one or more non-transitory computer-readable storage media of claim 16, wherein the resource exhaustion condition is detected in response to determining that the cache miss stalls for the processor unit are trending up and that the memory bandwidth usage is trending down, the remedial action comprising to allocate additional last-level cache for use by the processor unit.

20. The one or more non-transitory computer-readable storage media of claim 19, to allocate additional last-level cache for use by the processor unit comprising to reallocate cache allocated to a second processor unit to the processor unit.

21. The one or more non-transitory computer-readable storage media of claim 16, wherein the resource exhaustion condition is detected in further response to: (iii) determining that a ratio of a total traffic bandwidth generated by a traffic source to a memory bandwidth usage of the processor unit exceeds a traffic rebalancing threshold.

22. The one or more non-transitory computer-readable storage media of claim 21, wherein the remedial action comprises to modify one or more traffic routing rules that specify which traffic received at a traffic source is to be routed to the processor unit.

23. The one or more non-transitory computer-readable storage media of claim 21, wherein the remedial action comprises to redirect at least a portion of traffic provided by a traffic source to the processor unit to a second processor unit.

24. The one or more non-transitory computer-readable storage media of claim 16, wherein the plurality of cache miss stall metric samples comprises three or more cache miss stall metric samples and the plurality of memory bandwidth usage metric samples comprises three or more memory bandwidth usage metric samples.

25. A computing system comprising:
   an integrated circuit component comprising a processor unit;
   a resource exhaustion detection means to detect a resource exhaustion condition in response to:
      (i) determining that cache miss stalls for the processor unit executing an application are trending up based on a plurality of cache miss stall metric samples; and
      (ii) determining that memory bandwidth usage for the processor unit executing the application is trending up or trending down based on a plurality of memory bandwidth usage metric samples, wherein individual of the plurality of memory bandwidth usage metric samples indicate a measure of memory bandwidth used by the processor unit executing the application; and
   resource controller circuitry to take a remedial action in response to the resource exhaustion detection means detecting the resource exhaustion condition.

* * * * *